United States Patent [19]
Unterforsthuber et al.

[11] Patent Number: 6,062,656
[45] Date of Patent: May 16, 2000

[54] BRAKE SYSTEM FOR MOTOR VEHICLES

[75] Inventors: Jakob Unterforsthuber, Maisach; Dieter Jakobi, Puchheim; Johannes Kuehberger, Roehrmoos, all of Germany

[73] Assignee: Bayerische Motoren Werke Aktiengesellschaft, Munich, Germany

[21] Appl. No.: 09/166,151

[22] Filed: Oct. 5, 1998

[30] Foreign Application Priority Data

Oct. 4, 1997 [DE] Germany .............. 197 43 959

[51] Int. Cl.$^7$ .............. B60T 8/32; B60T 17/18; B60T 17/22

[52] U.S. Cl. ........... 303/122.09; 188/356; 303/114.3; 303/DIG. 4

[58] Field of Search ............. 303/114.3, 113.4, 303/114.1, 114.2, 155, 122.09, 122.11, DIG. 3, DIG. 4, 13–14, 15, 166, 167; 60/552, 403, 577, 582, 547.1; 188/356, 357

[56] References Cited

U.S. PATENT DOCUMENTS

| | | | |
|---|---|---|---|
| 3,685,289 | 8/1972 | Kobashi et al. | 60/552 |
| 5,855,420 | 1/1999 | Lawrence | 303/114.3 |
| 5,967,628 | 10/1999 | Abe et al. | 303/114.3 |

FOREIGN PATENT DOCUMENTS

| | | |
|---|---|---|
| 36 06 136 | 11/1986 | Germany . |
| 195 25 985 A1 | 1/1997 | Germany . |
| 195 42 654 A1 | 5/1997 | Germany . |

OTHER PUBLICATIONS

*ATZ Automobiltechnische Zeitschrift 99*, 1997, pp. 134–213 by Von Michael Debes et al. entitled "Dynamische Stabilitaets Control DSC der Baureihe 7 von BMW—Teil 1".

*Primary Examiner*—Douglas C. Butler
*Attorney, Agent, or Firm*—Evenson, McKeown, Edwards & Lenahan, PLLC

[57] ABSTRACT

In the case of a brake system for motor vehicles, having a brake pedal, a brake booster, a master brake cylinder and an electronically regulatable brake unit, which is arranged between the master brake cylinder and the wheel brakes and by which, via an electronic control unit, the brake pressure in the wheel brakes can be set independently of the preliminary pressure existing at the output of the master brake cylinder, when the brake booster fails, using the electronic control unit and the electronically regulatable brake unit, the brake pressure in the wheel brakes is generated such that a predetermined minimum desired deceleration course is obtained as a function of the pedal force applied by the driver by way of the brake pedal. The failure of the brake booster is recognized either when no difference is measured between the pressure in the vacuum chamber and the atmospheric pressure, but the pressure at the output of the master brake cylinder is rising or exceeds a predetermined threshold, or when the pressure in the working chamber is at most equal to the pressure in the vacuum chamber, but the pressure at the output of the master brake cylinder is rising or exceeds a predetermined threshold.

9 Claims, 3 Drawing Sheets ized by the electronic control unit assigned to the brake system. However, as an alternative, the direct measuring of the pedal force can also be done.

BRAKE SYSTEM FOR MOTOR VEHICLES

BACKGROUND AND SUMMARY OF THE INVENTION

This application claims the priority of German Patent Application No. 197 43 959.4, filed Oct. 4, 1997, the disclosure of which is expressly incorporated by reference herein.

The invention relates to a brake system for motor vehicles having a brake pedal, a brake booster, a master brake cylinder and an electronically regulatable brake unit, which is arranged between the master brake cylinder and the wheel brakes.

A brake system of this type is known, for example, by means of the DSC systems by BMW® which represent a further development of the ABS and ASC wheel slip control systems. A DSC system of this type by BMW® is described, for example, on Pages 134+ and Pages 208+ of *Automobiltechnische Zeitschrift ATZ*, 1997. Furthermore, a known brake system of this type is illustrated in FIG. 3.

A part of these known brake systems is a brake booster. When this brake booster fails, according to the acceptance requirements of type approvals (currently when a foot pressure of maximally 500 N is exceeded), a deceleration of 2.9 m/s² must be achieved. This requirement can be met by the corresponding design of the hydraulic-mechanical transmission ratio (pedal ratio, master brake cylinder diameter). However, this design of the ratio conditions results in long pedal travels in the case of heavy vehicles and in an undesirably soft pedal sensation during normal braking. When the brake booster fails, the pedal forces required for a deceleration are so high that the driver may suspect a total failure of the brake system and may react inappropriately.

It is an object of the invention to improve upon the brake system of the above-mentioned type such that a satisfactory deceleration is achieved for the driver even when the brake booster has failed.

This object is achieved by a brake system for motor vehicles having a brake pedal, a brake booster, a master brake cylinder and an electronically regulatable brake unit arranged between the master brake cylinder and the wheel brakes. The brake pressure in the wheel brakes can be set independently of the preliminary pressure existing at the output of the master brake cylinder with an electronic control unit. In the event of a failure of the brake booster, by means of the electronic control unit and by means of the electronically regulatable brake unit, the brake pressure in the wheel brakes is generated such that a predetermined minimum desired deceleration value occurs as a function of a pedal operating value which is directly proportional to the pedal force applied by the driver by way of the brake pedal. Advantageous further developments of the invention are described herein.

Important aspects of the invention are the recognition of a failure of the brake booster and the generating of a brake pressure in the wheel brakes using the electronically regulatable brake unit such that, in the event of a defined pedal force applied by the driver by way of the brake pedal, a minimum deceleration occurs corresponding to a defined minimum desired deceleration course. This pedal force is determined directly (or from a pedal operating value which is directly proportional to the pedal force applied by the driver) by way of the brake pedal. Such a pedal operating value is preferably the preliminary pressure which exists at the output of the master brake cylinder and which normally is sensed anyhow with a pressure sensor in the hydraulic line In the presence of defined pedal force or pedal operating value, the achieved actual deceleration is then determined in the electronic control unit and is compared with the desired deceleration corresponding to the predetermined minimum desired deceleration course. If the desired deceleration is larger than the actual deceleration, the electronically regulatable brake unit increases the brake pressure in the wheel brakes until the desired deceleration has been reached.

The predetermined minimum desired deceleration course is stored, for example, as a characteristic curve in the electronic control unit and is defined such that the acceptance conditions for a type approval are minimally met in the event of a failure of the brake booster.

The basic prerequisite for the brake system according to the invention is an electronically regulatable brake unit, such as the DSC hydraulic system, by which, independently of the pedal force applied by the driver by way of the brake pedal or independently of the preliminary pressure existing at the output of the master brake cylinder, the brake pressure can be adjusted in the wheel brakes.

The failure of the brake booster is preferably recognized in two different manners.

1. A failure of the brake booster exists, for example, when no vacuum exists in the brake booster. This is sensed by a differential pressure sensor on the brake booster which compares the pressure in the brake booster, for example, in its vacuum chamber, with the atmospheric pressure and emits a signal when there is no difference. When the differential pressure sensor, which may also be constructed only as a switch, indicates the presence of atmospheric pressure in the brake booster but simultaneously pressure is built up in the master brake cylinder by the operating of the brake pedal by the driver, the electronic control unit will conclude that there is a failure of the brake booster. This method recognizes the most frequently occurring cause of a failure due to a defective vacuum supply.

2. A failure of the brake booster will also exist when, although a vacuum is present in the brake booster, the intake of atmospheric air is prevented. In this case, a slightly lower pressure or a slightly higher vacuum may arise than in the vacuum chamber of the brake booster when the driver operates the brake pedal. At most, the same pressure or vacuum will arise in the working chamber as in the vacuum chamber. However, when the system is intact, the pressure in the working chamber will normally always be higher than in the vacuum chamber when the brake pedal is operated. The pressure difference between the pressure in the working chamber and the pressure in the vacuum chamber can be detected by a differential pressure sensor between the working chamber and the vacuum chamber.

When a failure of the brake booster is recognized, in addition to generating the brake pressure by the electronically regulatable brake unit, the driver can also be warned.

As a result of the brake system according to the invention, the driver can still brake by means of reasonable pedal forces in the event of a failure of the brake booster.

Other objects, advantages and novel features of the present invention will become apparent from the following detailed description of the invention when considered in conjunction with the accompanying drawings.

DETAILED DESCRIPTION OF THE DRAWINGS

Figure 3:
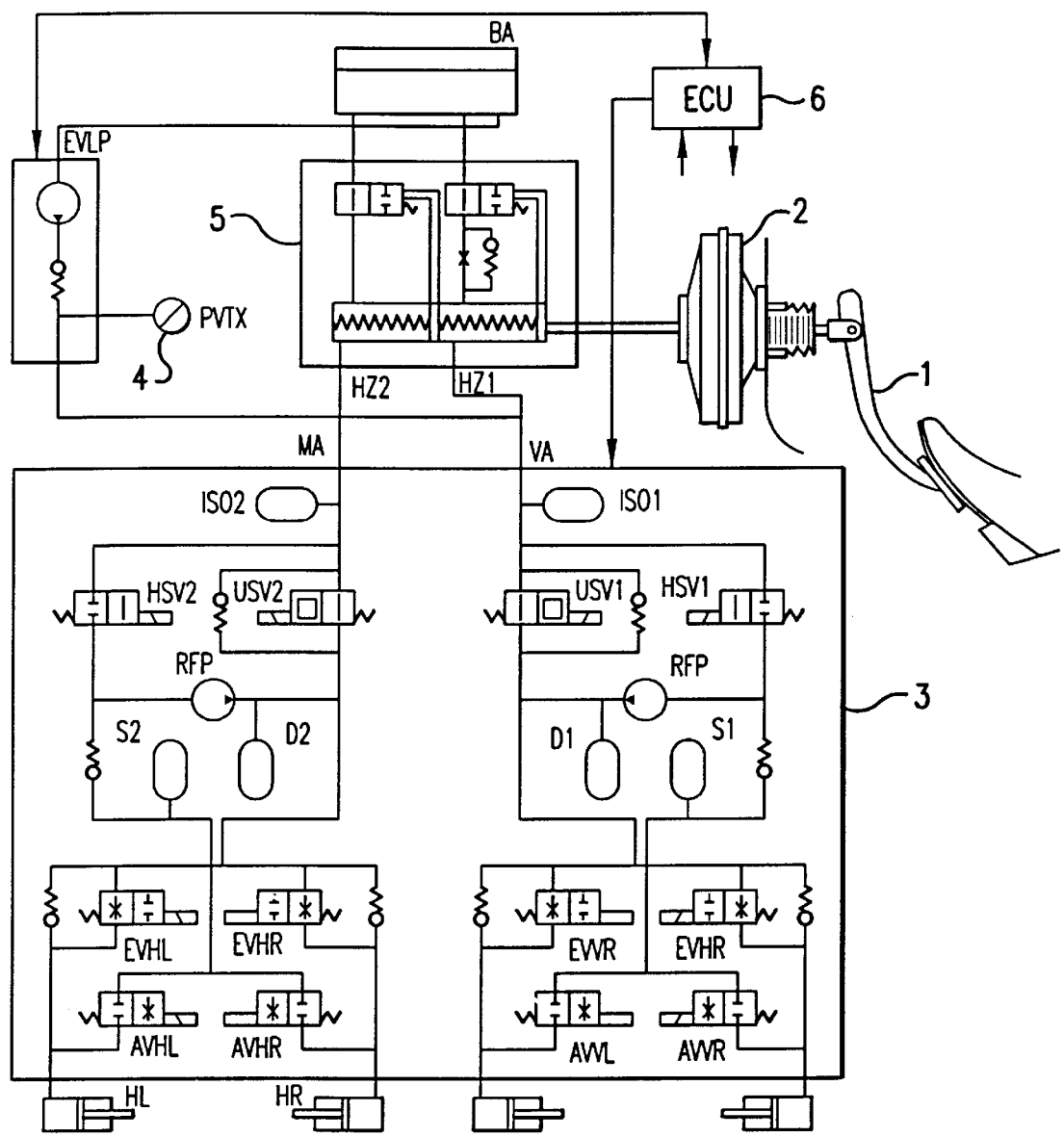
FIG. 3 is a cross-sectional view of a possible known brake system by which the invention can be implemented.

FIG. 3 illustrates a known brake system, as partially shown, for example, on Page 212 of the above-mentioned document *ATZ*, 1997. In the case of this brake system, a brake pedal 1 is connected with a brake booster 2; a brake booster 2 is connected with a master brake cylinder 5; and a master brake cylinder 5 is connected with an electronically regulatable brake unit 3, here, a hydraulic unit. By means of the electronically regulatable brake unit in the form of a hydraulic unit 3, the brake pressure in the wheel brakes HL, HR, VL and VR can be adjusted independently of the preliminary pressure existing at the output of the master brake cylinder 5. By means of a preliminary pressure sensor 4, the preliminary pressure (Pvor) existing at the output of the master brake cylinder 5 can be detected by an electronic control unit 6 assigned to the brake system. This preliminary pressure is a pedal operating value which is directly proportional to the pedal force F applied by the driver by way of the brake pedal.

The electronic control unit 6 has additional inputs and outputs for additional input and output signals; in particular, control lines from the control unit 6 are provided for triggering the actuators of the brake unit 3.

The following legend is provided for the features of FIG. 3.

| | | | |
|---|---|---|---|
| AVHL | outlet valve rear left | HR | wheel brake rear right |
| AVHR | outlet valve rear right | HSV1, HSV2 | high-pressure switching valve 1, 2 |
| AVVL | outlet valve front left | HZ1, HZ2 | master cylinder connection 1, 2 |
| AVVR | outlet valve front right | ISD1, ISD2 | integrated suction damper 1, 2 |
| BA | brake fluid compensation tank | Pvor | preliminary pressure sensor |
| D1, D2 | damper chamber | S1, S2 | storage chamber 1, 2 |
| EVHL | inlet valve rear left | sRFP | regenerative recirculating pump |
| EVHR | inlet valve rear right | U1, U2 | vacuum protection valve 1, 2 |
| EVLP | single precharge pump | USV1, USV2 | switch valve 1, 2 |
| EVVL | inlet valve front left | VA | front axle (hydraulic connection) |
| EVVR | inlet valve front right | VL | wheel brake front left |
| HA | rear axle (hydraulic connection) | R | wheel brake front right |
| HL | wheel brake rear left | | |

Figure 1:
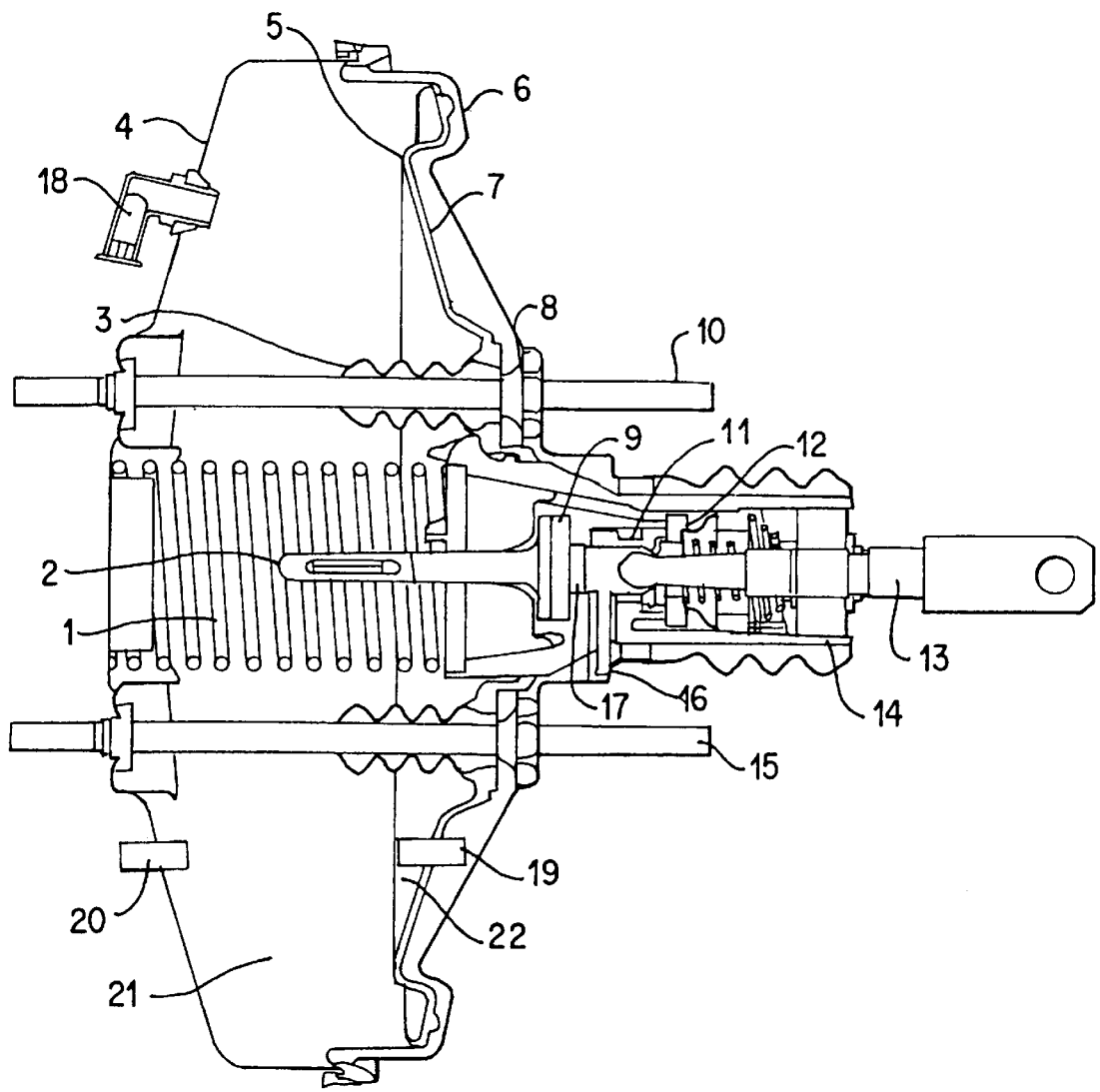
FIG. 1 is schematic view of a brake booster which is provided with differential pressure sensors for recognizing the failure of the brake booster.

FIG. 1 illustrates a possible embodiment of the brake booster illustrated in FIG. 3. Known brake boosters have, for example, the following components: A spring 1, a reaction piston 2, sealing bellows 3, a housing bottom 4, a diaphragm disk 5, a housing cover 6, a diaphragm 7, a valve housing 8, a reaction disk 9, a holding bolt 10, a sensing piston 11, a control valve 12, an operating rod 13, an air filter 14, a holding bolt 15, a locking bar 16, a sensing disk 17 and a vacuum connection 18.

For explaining the method of operation of known brake boosters, reference is made, in particular, to the publication (No. XFB 113(D)) of the Lucas Company concerning brake operating devices, 1994, Page 2.13 to 2.20.

An important aspect of the invention is the expansion of a known brake booster 2 (FIG. 3) of the vacuum type according to FIG. 1 by a differential pressure sensor 20 between the vacuum chamber 21 of the brake booster and the atmosphere as well as by a differential pressure sensor 19 between the vacuum chamber 21 and the working chamber 22 of the brake booster. The pressure sensors 19 and 20 may be designed only as switches whose first switching condition is set when a differential pressure is present and whose second switching position is set when no differential pressure is present.

The signals of the differential pressure sensors 19 and 20 are sensed and analyzed by the control unit 6. If it is recognized from the differential pressure sensor 20 (FIG. 1) that no difference exists between the pressure in the vacuum chamber 21 and the atmospheric pressure, and if i is recognized by the preliminary pressure sensor 4 (FIG. 3) that the pressure at the output of the master brake cylinder 5 is rising or has exceeded a given threshold, the control unit 6 will conclude that the brake booster is failing. In this case, no vacuum exists in the brake booster.

In addition or as an alternative, the control unit 6 will draw the conclusion that the brake booster is failing when it is recognized from the differential pressure sensor 19 that the pressure in the working chamber 22 is at most equal to the pressure in the vacuum chamber 21 and when it is simultaneously recognized from the preliminary pressure sensor 4 (FIG. 3) that the pressure at the output of the master brake cylinder 5 is rising or has exceeded a given threshold. If it can clearly be measured by means of the differential pressure sensor 19 that the pressure in the working chamber 22 is lower than the pressure in the vacuum chamber 21 or that the vacuum in the working chamber 22 is higher than the vacuum in the vacuum chamber 21, a conclusion can already be drawn that the brake booster is failing before it is recognized from the preliminary pressure sensor 4 (FIG. 3) that the pressure at the output of the master brake cylinder 5 is rising or has exceeded a given threshold. In these cases, the taking-in of atmospheric air into the working chamber 22 is hindered.

If, for example, in the above-described manner, the failure of a brake booster is recognized, by the electronic control unit 6 and by the electronically regulatable brake unit 3, the brake pressure p in the wheel brakes HL, HR, VL and VR is generated such that a given minimum desired deceleration course B or C (FIG. 2) is obtained as a function of the pedal force F or of a pedal operating value proportional thereto.

Figure 2:
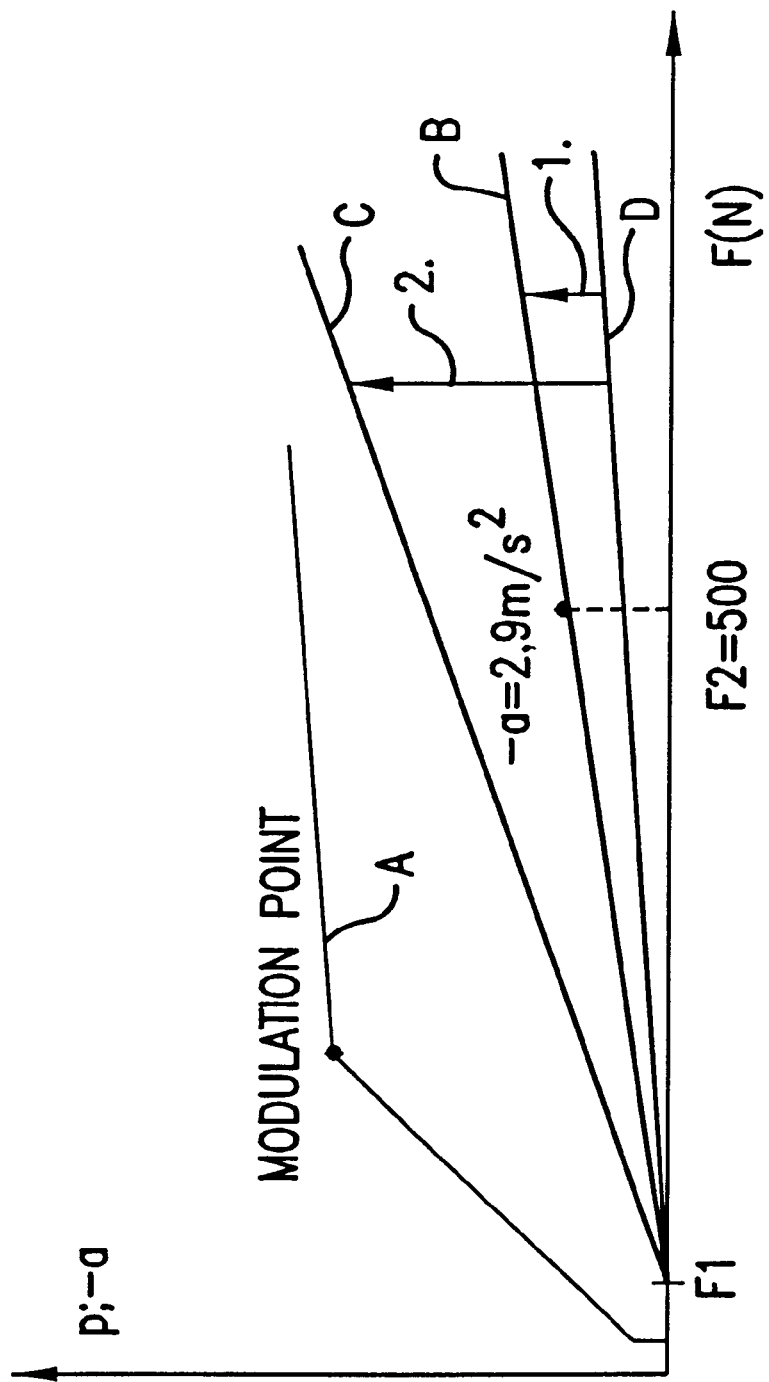
FIG. 2 is a graphical view of examples of a minimum desired deceleration course.

In FIG. 2, the pedal force F is listed in Newtons (N) on the X-axis (abscissa) and the brake pressure P in the wheel brakes, which is directly proportional to the deceleration of the vehicle, is listed on the Y-axis (ordinate). The deceleration course A (thin-lined) represents a normal deceleration course when the brake booster is intact, the gradient of the course A decreasing at the modulation point. The gradient of the deceleration course A after the modulation point corresponds to the gradient of the deceleration course D which would only still be reached in the event of a failure of the brake booster. However, if it is, for example, stipulated as an acceptance prerequisite for a type test that, in the event of the failure of the brake booster, by means of a foot pressure of 500 N, a deceleration –a of 2.9 m/s$^2$ must be reached, in a case 1., the deceleration course B is defined as the minimum desired deceleration course. However, as an alternative, in a case 2., a minimum desired deceleration course C can also be defined which results in a higher deceleration in comparison to the acceptance prerequisites. However, by means of the deceleration course C, the characteristic of the braking behavior should still deviate from that of a braking behavior with an intact brake booster in order to haptically draw the driver's attention to an anomaly.

Therefore, if the failure of the brake booster is recognized in the control unit 6, the brake pressure p is generated in the wheel brakes such that, as a function of the pedal force F, the minimum desired deceleration course B or C is obtained.

By means of this embodiment according to the invention, on the one hand, the driver's attention is drawn to the presence of an abnormal situation; but, on the other hand, a satisfactory deceleration is still provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle brake system having a brake pedal, a brake booster, a master brake cylinder and an electronically regulatable brake unit arranged between the master brake cylinder and wheel brakes of the vehicle, comprising:

an electronic control unit which sets a brake pressure in the wheel brakes independently of a preliminary pressure existing at an output of the master brake cylinder;

wherein in an event of a failure of the brake booster, the electronic control unit and the electronically regulatable brake unit coupled thereto generate a brake pressure in the wheel brakes such that a predetermined minimum desired deceleration value occurs as a function of a pedal operating value which is directly proportional to a pedal force applied by a driver via a brake pedal.

2. The brake system according to claim 1, wherein the failure of the brake booster is recognized when there is no difference between a pressure in a vacuum chamber and an atmospheric pressure, but the pressure at the output of the master brake cylinder is rising or exceeds a predetermined threshold.

3. The brake system according to claim 1, wherein the failure of the brake booster is recognized when a pressure in the working chamber is at most equal to a pressure in a vacuum chamber, but the pressure at the output of the master brake cylinder is rising or exceeds a predetermined threshold.

4. The brake system according to claim 2, wherein the failure of the brake booster is recognized when a pressure in the working chamber is at most equal to a pressure in a vacuum chamber, but the pressure at the output of the master brake cylinder is rising or exceeds a predetermined threshold.

5. A process for controlling a motor vehicle brake system having a brake pedal, a brake booster, a master brake cylinder, an electronic control unit and an electronically regulatable brake unit arranged between the master brake cylinder and wheel brakes of the vehicle, the process comprising the acts of:

setting a brake pressure in the wheel brakes independently of a preliminary pressure existing at an output of the master brake cylinder; and in an event of a failure of the brake booster, generating a brake pressure in the wheel brakes such that a predetermined minimum desired deceleration value occurs as a function of a pedal operating value which is directly proportional to a pedal force applied by a driver via a brake pedal.

6. The process according to claim 5, further comprising the act of recognizing the failure of the brake booster when no difference is measured between a pressure in a vacuum chamber and an atmospheric pressure while the pressure at the output of the master brake cylinder is rising or exceeds a predetermined threshold.

7. The process according to claim 5, further comprising the act of recognizing the failure of the brake booster when a pressure in the working chamber is at most equal to a pressure in a vacuum chamber while the pressure at the output of the master brake cylinder is rising or exceeds a predetermined threshold.

8. The process according to claim 6, further comprising the act of recognizing the failure of the brake booster when a pressure in the working chamber is at most equal to a pressure in a vacuum chamber while the pressure at the output of the master brake cylinder is rising or exceeds a predetermined threshold.

9. A software product for controlling a motor vehicle brake system having a brake pedal, a brake booster, a master brake cylinder, an electronic control unit and a electronically regulatable brake unit arranged between the master brake cylinder and wheel brakes of the vehicle, the software product comprising:

a computer readable medium having stored thereon program code segments that:

set a brake pressure in the wheel brakes independently of a preliminary pressure existing at an output of the master brake cylinder; and in an event of a failure of the brake booster, generate a brake pressure in the wheel brakes such that a predetermined minimum desired deceleration value occurs as a function of a pedal operating value which is directly proportional to a pedal force applied by a driver via a brake pedal.

* * * * *